US012210663B2

(12) United States Patent
Bhunia et al.

(10) Patent No.: US 12,210,663 B2
(45) Date of Patent: Jan. 28, 2025

(54) DECOMMISSIONING AND ERASING ENTROPY IN MICROELECTRONIC SYSTEMS

(71) Applicant: University of Florida Research Foundation, Inc., Gainesville, FL (US)

(72) Inventors: Swarup Bhunia, Gainesville, FL (US); Md Moshiur Rahman, Gainesville, FL (US); Aritra Dasgupta, Gainesville, FL (US); Abdulrahman Alaql, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 156 days.

(21) Appl. No.: 17/573,053

(22) Filed: Jan. 11, 2022

(65) Prior Publication Data

US 2022/0222386 A1    Jul. 14, 2022

Related U.S. Application Data

(60) Provisional application No. 63/136,871, filed on Jan. 13, 2021.

(51) Int. Cl.
  *H04L 29/06* (2006.01)
  *G06F 21/85* (2013.01)
  *G06F 21/86* (2013.01)

(52) U.S. Cl.
  CPC .............. *G06F 21/85* (2013.01); *G06F 21/86* (2013.01)

(58) Field of Classification Search
  CPC .................................. G06F 21/85; G06F 21/86
  See application file for complete search history.

(56) References Cited

U.S. PATENT DOCUMENTS

| | | | | |
|---|---|---|---|---|
| 4,974,048 | A  * | 11/1990 | Chakravorty | ......... H01L 21/485 |
| | | | | 219/121.85 |
| 9,189,656 | B1 * | 11/2015 | Baker | .................... G06F 21/554 |
| 9,818,059 | B1 * | 11/2017 | Woo | ......................... G06N 3/08 |
| 2014/0173324 | A1 * | 6/2014 | Dobbs | ........................ G06F 1/04 |
| | | | | 713/501 |
| 2014/0189365 | A1 * | 7/2014 | Cox | ......................... G06F 21/72 |
| | | | | 713/189 |
| 2016/0070634 | A1 * | 3/2016 | Shirlen | ............... G06F 11/3495 |
| | | | | 714/45 |
| 2017/0323201 | A1 * | 11/2017 | Sutskever | ............. G06F 3/0653 |
| 2019/0258251 | A1 * | 8/2019 | Ditty | ...................... G06N 3/063 |
| 2021/0117578 | A1 * | 4/2021 | Cheruvu | ................. G06F 21/85 |
| 2022/0209559 | A1 * | 6/2022 | Jakes | .................. H01M 10/488 |

* cited by examiner

*Primary Examiner* — Evans Desrosiers
(74) *Attorney, Agent, or Firm* — Thomas | Horstemeyer, LLP

(57) ABSTRACT

The present disclosure describes various embodiments of systems, apparatuses, and methods of protecting an integrated circuit. One such method comprises operating the integrated circuit under a normal mode of operation; detecting, by a decommission controller, a triggering condition for a decommission operation to be initiated for the integrated circuit; initiating, by the decommission controller, a decommission mode for the integrated circuit after detection of the triggering condition; and causing, by the decommission controller, functionality of the integrated circuit to be irreversibly disabled after initiating the decommission mode. Other methods, systems, and apparatus are also presented.

16 Claims, 13 Drawing Sheets

DECOMMISSIONING AND ERASING ENTROPY IN MICROELECTRONIC SYSTEMS

CROSS-REFERENCE TO RELATED APPLICATION

This application claims priority to U.S. provisional application entitled, "Decommissioning and Erasing Entropy in Microelectronic Systems," having Ser. No. 63/136,871, filed Jan. 13, 2021, which is entirely incorporated herein by reference.

BACKGROUND

Hardware intellectual properties (IPs) used in diverse electronic components—from microchips to printed circuit boards (PCBs)—face several critical security issues during their life cycle, including piracy, reverse engineering, and extraction of design secrets. Modern electronic hardware, in particular, chips and PCBs, increasingly contain valuable secrets, which include cryptographic keys, chip identifiers (obtained from on-chip security primitives, such as physical unclonable functions or those programmed in non-volatile memory), sensitive personal secrets (such as credit card info, physiological data of a user, etc.), diverse configuration data, bitstreams, and defeature bits, firmware, security policies, unlocking keys for a locked design, watermarks, trained machine learning models, and the hardware design (both analog and digital circuits) itself. An adversary can perform various functional and physical analysis attacks to a deployed electronic system in order to obtain critical information about the design intent, stored information, and used technology. Due to easy accessibility to deployed systems and the wide availability of advanced measurement/analysis tools, these attacks have become increasingly viable. The emerging internet of things (IoT) regime makes this threat more prominent by making many electronic systems, such as drones or unmanned vehicles and distributed sensor networks, vulnerable to powerful physical attacks. Extraction of these secrets during deployment of an electronic system is a significant threat for systems which are retired, discarded, or lost (i.e., no longer in possession of its legitimate owner).

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 9A-9C illustrate logical erasing of a functionality of an intellectual property core (IP) by extending a sequential obfuscation algorithm in accordance with various embodiments of the present disclosure, in which FIG. 9A shows a state transition diagram of an OFSM to obfuscate an IP; FIG. 9B shows an extension of the OFSM to insert additional states in order to facilitate DEEM; and FIG. 9C provides a legend for FIGS. 9A-9B.

DETAILED DESCRIPTION

Figure 1A:
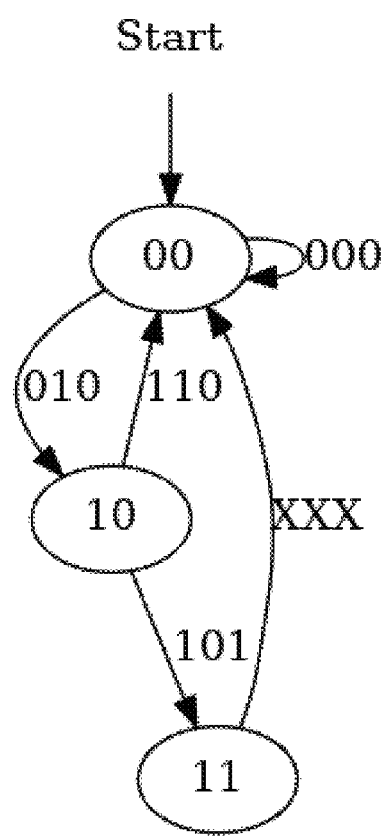
FIG. 1A shows a state transition graph of a finite state machine (FSM) of two flip-flops in accordance with the present disclosure.

The present disclosure describes various embodiments of systems, apparatuses, and methods of decommissioning and erasing of entropy in microelectronic systems (DEEM). Such systems, apparatuses, and methods can safely and securely 'decommission' an electronic system—either retired or lost—by disabling it irreversibly and permanently erasing stored 'entropy'— e.g., any valuable secrets on the system. This is, in principle, analogous to disabling (e.g., permanently locking) and erasing data from a lost smartphone. In accordance with various embodiments of the present disclosure, DEEM is a security measure that completely erases and destroys any critical part of the system when pre-determined authenticated trigger conditions are met. In various embodiments, the DEEM framework involves a combination of low-overhead analog & digital disabling and erasing techniques that can perform irreversible transformations at judicious locations of a microelectronic system and thus can securely 'decommission' it. As an added benefit, DEEM provides automatic protection against chip/PCB recycling (e.g., putting used parts back to the supply chain), which has emerged as a dominant form of counterfeiting attacks.

As an overview, the security of hardware intellectual properties (IPs) in the form of manufactured chips or printed circuit boards (PCBs) has been a rising concern. Around $250 billion is lost every year due to IP piracy, which has caused a devastating impact on the semiconductor industry around the world. In that capacity, attackers aim to utilize available capabilities and techniques to extract secret information or design aspects of the IPs under attack to clone those IPs and create counterfeits. Such techniques have become more sophisticated and advanced as tools and equipment have become more accessible and easier to obtain. Many IP protection techniques have been implemented to protect these IPs in their life cycle.

One possible solution that IP vendors apply is design obfuscation, where obfuscation mechanisms are inserted into an integrated circuit to lock the functionality of the IP and/or hide critical information. Additionally, authentication techniques and watermarks have also been implemented to detect unauthorized access to these IPs. Unfortunately, most existing protection solutions are designed to prevent malicious activities during the development cycle of the hardware IPs. These techniques are not preventive from any adversarial attempts to deployed systems.

Modern electronic hardware, in particular, chips and PCBs, increasingly contain a large number of valuable secrets, which are important to safeguard from both the manufacturer's and end-user's perspective. These secrets include (but are not limited to) (1) cryptographic keys used to encrypt/decrypt information, digital certificates, stored passwords, and other authentication signatures; (2) watermarks of a hardware design; (3) chip identifiers (obtained from on-chip security primitives, such as physical unclonable functions or those programmed in non-volatile memory); (4) sensitive personal secrets (such as credit card info, physiological data of an user, etc.); (5) diverse configuration data; (6) bitstreams for programmable hardware; (7) defeature bits; (8) firmware; (9) security policies; (10) unlocking keys for a locked design; (11) trained machine learning models or classifiers or any trained parameters in an artificial intelligence model; and (12) the hardware design (both analog and digital circuits) itself.

Such secrets need to be protected both during deployment as well as during end-of-life of an electronic component through a systematic decommissioning process. To address this type of critical need, the present disclosure presents systems, apparatuses, and methods for Decommissioning and Erasing of Entropy in Microelectronic systems (DEEM). In general, DEEM is a destruction-based process that performs a set of irreversible transformations to the protected system, in which the transformations are performed to carefully selected critical parts of the circuit, where analog and digital secrets are completely erased in a timely fashion. The present disclosure provides an overview of embodiments of the implemented DEEM mechanisms in a System on Chip (SoC) and outlines a wide variety of triggering conditions, as well as erasing mechanisms in both pre-silicon and post-silicon abstracts. As a by-product, various embodiments of a DEEM provide automatic protection against chip and PCB recycling, which has emerged as a dominant form of counterfeiting attacks.

A realistic or commercial IP, in most cases, contains control logic that dictates the operation of the IP. Based on the current operational state and external inputs to the IP, exemplary control logic determines the next state of the operation. In various embodiments, a finite number of operating states are encoded using a behavioral finite state machine (FSM) which constitutes the control logic block of the IP. In a synthesized gate-level netlist, an FSM is a group of flip-flops with combinational logic gates that create a next state logic (inputs of the flip-flops) based on a current state (outputs of flip-flops).

Let us consider a design that operates in three unique states {00; 10; 11} which are to be encoded using an FSM of two flip-flops. In each state of operation, the FSM generates certain outputs, commonly termed as control signals that can be used by the data-path of the design. Table 1 (below) reflects the state transition conditions of the FSM. A corresponding state transition graph (STG) of the FSM is shown in FIG. 1A, where the combination of inputs required to make a transition is mentioned in each edge of the graph.

TABLE 1

| State Transition Table | | | | | | |
|---|---|---|---|---|---|---|
| Inputs | | | Current State | | Next State | |
| In2 | In1 | In0 | $Q_{1c}$ | $Q_{0c}$ | $Q_{1n}$ | $Q_{0n}$ |
| 0 | 0 | 0 | 0 | 0 | 0 | 0 |
| 0 | 1 | 0 | 0 | 0 | 1 | 0 |
| 1 | 1 | 0 | 1 | 0 | 0 | 0 |
| 1 | 0 | 1 | 1 | 0 | 1 | 1 |
| X | X | X | 1 | 1 | 0 | 0 |

Figure 1B:
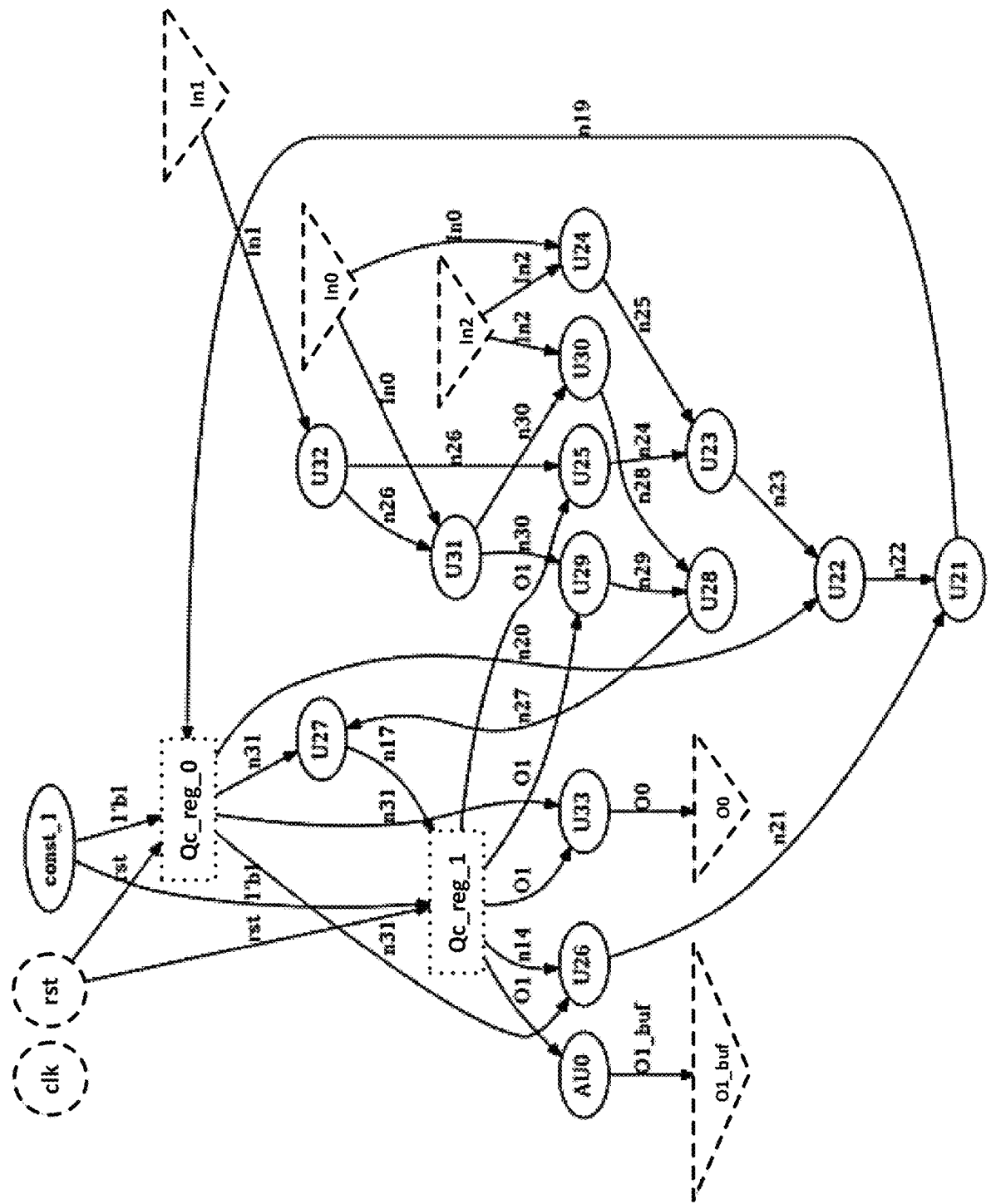
FIG. 1B shows a structure of a netlist for a circuit design in accordance with the present disclosure.

The state transition table can be represented in behavioral hardware description language (HDL), e.g., Verilog/VHDL, which can be then synthesized to generate the gate-level netlist of a design, where the netlist contains a set of combinational gates and sequential flip-flops. A netlist structure is illustrated as a connected graph in FIG. 1B, where instances having a dashed outline pattern are primary inputs/outputs, instances having a dotted outline pattern are flip-flops, and the rest (having a solid outline pattern) are combinational cells.

In a typical hardware IP, the size of the FSM, or in another terms, number of operational states will be few. In addition to that available entire state space may not be utilized. For example, the FSM presented in FIG. 1A has three operational/reachable states which requires the netlist to contain two flip-flops (considering binary encoding is being used). However, two flip-flops can reach a maximum of four states ($2^{number\ of\ flip\text{-}flops}$). Due to not using all possible states, the reachability of the FSM remains low. Correspondingly, less reachability of a state space makes it easier for an attacker to reverse engineer the FSM and figure out the operation of the control logic of the IP. In addition, the common structure of an FSM in a gate-level design is a group of flip-flops with direct feedback paths from their outputs to the inputs, which also adds up to the advantage of the attacker to completely isolate the small state machine and reverse engineer more precisely. These factors are detrimental and serious threats to the life cycle of the IP, leading to piracy, cloning, and re-using of IP. Hence, to increase the reachability of the state space as well as to perform significant transformation of the structure of the netlist to disguise the intended functionality of the IP, state space obfuscation can play a vital role.

In the last decade, several hardware obfuscation techniques have been proposed. Since most of the efforts have been evolving in combinational logic obfuscation, sequential logic obfuscation field has a lot to be explored. In addition, some sequential obfuscation techniques have tried to address the vulnerability associated with relatively small state space of a design.

As an example, a boosted FSM (BFSM) obfuscation technique involves modification of FSM flip-flops in a way that forces the FSM to power-up from an unreachable state. As such, a random unit block (RUB) can be placed inside the design to generate the random initial state and force the flip-flops. Once the design powers up from a unique unreachable state, multiple transition paths are available to be traversed to reach the pre-modified initial state of the FSM by applying a sequence of inputs that essentially becomes the unlocking key sequence. BFSM mostly modifies the state transition graph of the FSM keeping the FSM structure intact. While BFSM is a scheme deployed to protect the fabricated IC as the assumption is that the attacker cannot access the design flip-flops, the threat model does not consider the gate-level design being acquired by the manufacturing foundry. Accordingly, such assumptions, vulnerabilities related to the security of the RUB, and minimal to zero structural transformation weaken the BFSM scheme given that an intelligent or knowledgeable attacker can break into the design by bypassing or removing the extra states.

A HARPOON obfuscation technique incorporates an addition of an extra entrance FSM that controls XOR/XNOR gates that are being placed as obfuscation logic in a combinational logic of the gate-level netlist. Upon application of a pre-defined sequence of patterns through primary inputs, the added FSM can be brought to a normal mode of operation and used to configure XOR/XNOR gates to retain the intended functionality of the design. Application of a wrong key will keep the added FSM in an obfuscated state and internal nodes will be inverted to corrupt the operation of the design. Although, HARPOON essentially increases the number of states by introducing a number of flip-flops in an extra FSM, there is no dependency of the added FSM on the existing FSM in the design and vice versa, which means completely independent state transitions in two different FSMs in the design. Such isolated FSM insertion can easily be broken by reverse engineering the added FSM using Automated Test Pattern Generation (ATPG) tools and other structural attacks.

Regarding a flip-flop output inversion obfuscation technique, a technology mapped gate-level netlist contains a number of flip-flops where each of the flip-flops contains two outputs (usually Q and $\overline{Q}$). A scan guided obfuscation technique inserts a multiplexer to the output of the flip-flops where multiplexer inputs are connected to Q and $\overline{Q}$ and the multiplexer output is connected to the combinational logic that was originally at the output of the flip-flop. The select pin of the multiplexer is driven by an external input of the design which becomes the key input (as in combinational logic obfuscation). By applying a correct key bit to the key input, either Q or $\overline{Q}$ will be passed to the combinational logic. However, application of a wrong key will create an inversion of the required value and will create non-functional behavior. Such an inversion modifies the state encoding only. Thus, states are not being protected from being known to the attacker as the state space as well as the structure of the FSM is not modified, which makes the inversion vulnerable to a number of structural attacks, including an SAT attack.

Figure 2:
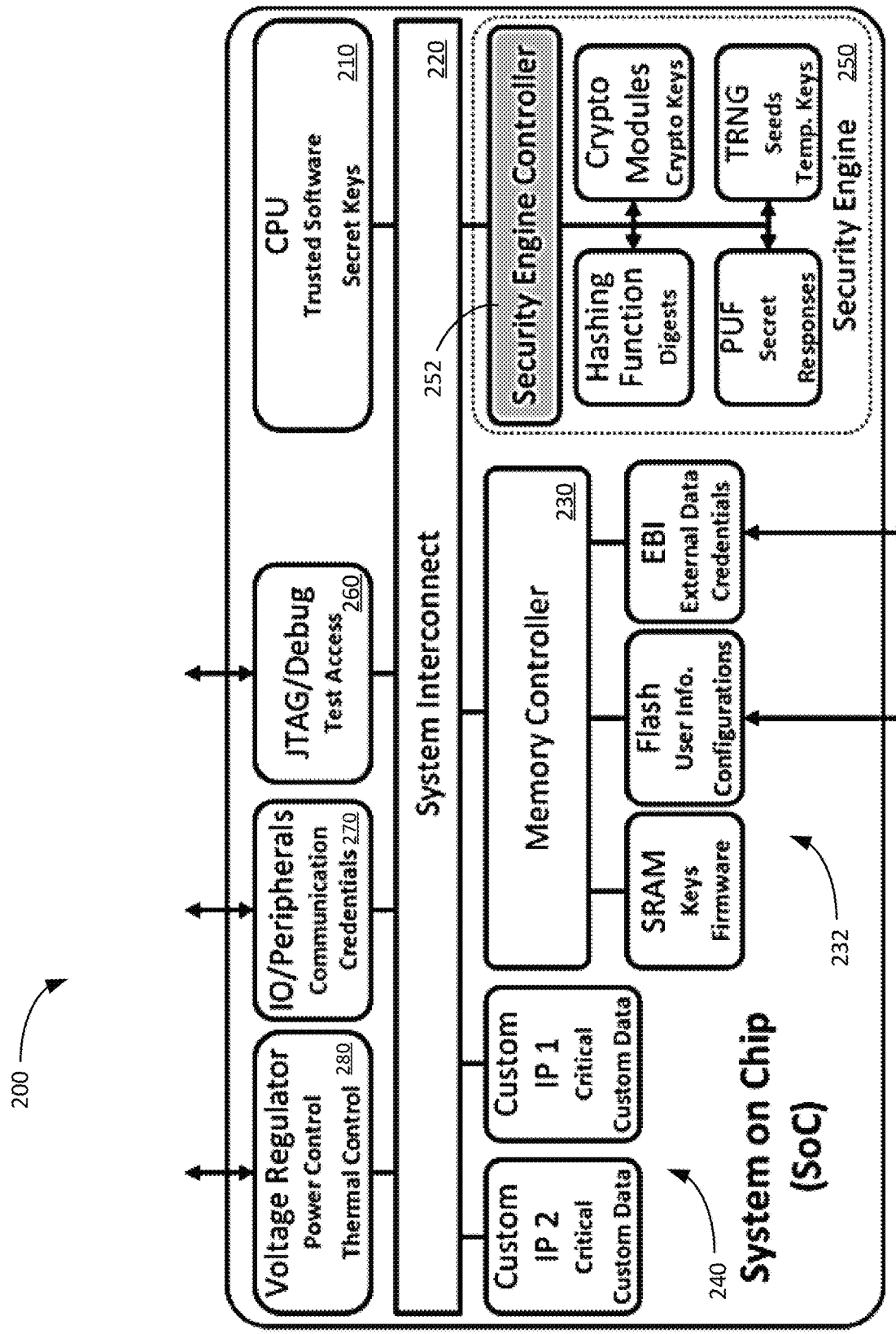
FIG. 2 shows an overview of a system on chip (SoC) and its critical assets in accordance with the present disclosure.

To protect the assets of a system on chip (SoC), all design secrets in the form of physical structures and digital data must be completely destroyed. An overview of a system on chip is illustrated in FIG. 2, where critical assets are denoted as IP1 and IP2. Accordingly, an SoC 200 may include a processor (CPU) 210, system interconnect bus(es) 220, a memory controller 230 and internal memory 232, intellectual property (IP) blocks 240 (e.g., IP1 and IP2), a security engine block 250 having a security engine controller 252, JTAG/Debug test interface 260, Input & Output peripherals 270, and a voltage regulator 280, among other components.

Figure 3:
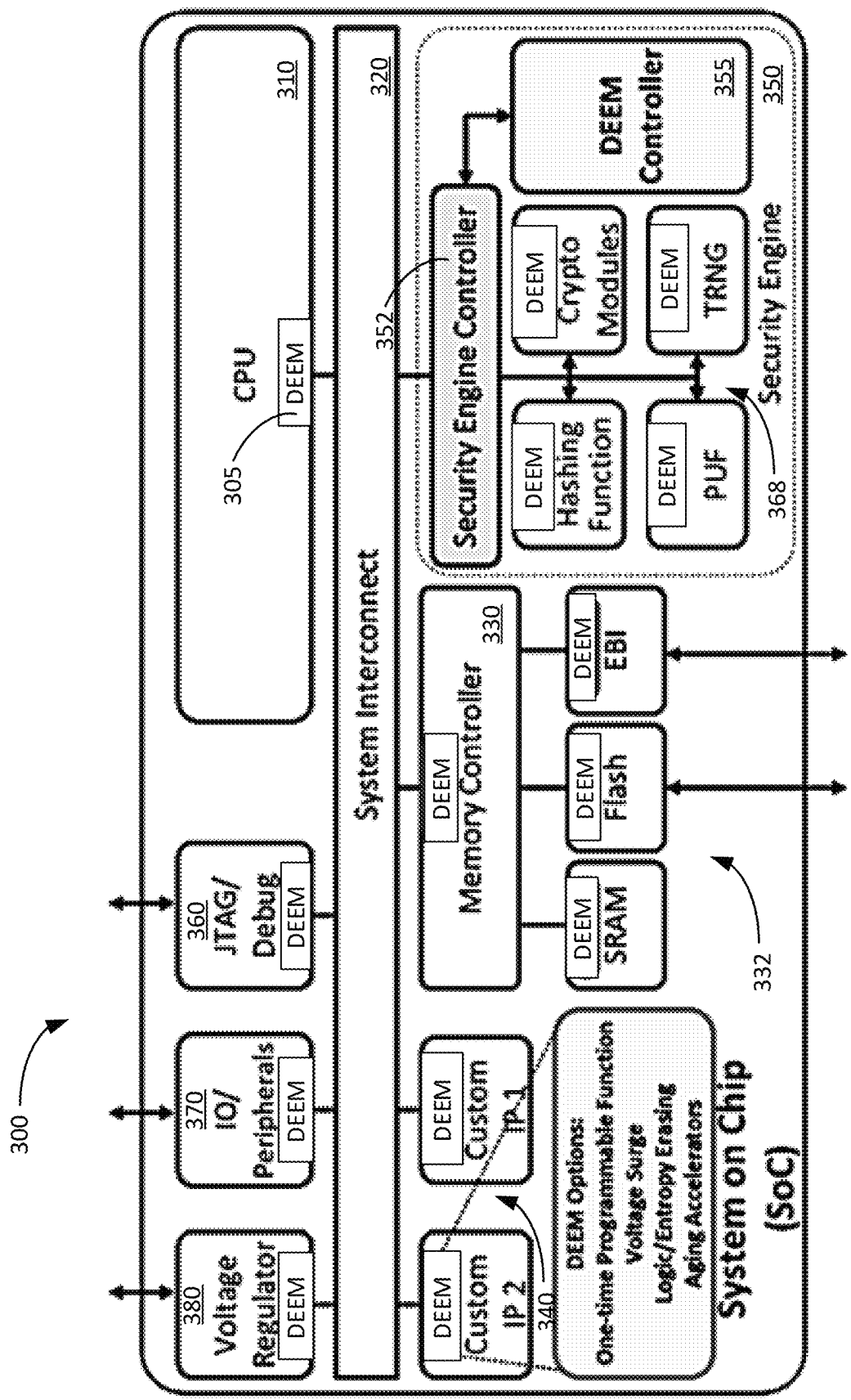
FIG. 3 shows an overview of an SoC having modules incorporated into each component/IP for Decommissioning and Erasing of Entropy in Microelectronic systems (DEEM) in accordance with various embodiments of the present disclosure.

In accordance with embodiments of the present disclosure, an exemplary DEEM process is developed to completely decommission and erase all critical components in the protected system. Hence, a set of digital and analog transformations can be performed across the system to hide and erase any secrets or critical data. To perform these digital and analog transformations, a secure DEEM controller 355 (FIG. 3) is developed and incorporated in the system's security engine, in various embodiments. Additionally, a set of decommissioning mechanisms (e.g., one-time programmable (OTP) modules) (DEEM modules) 305 (FIG. 3) are incorporated into the system's critical assets to ensure irreversible destruction of the system when a DEEM mode is initiated. With the DEEM mode incorporated into the SoC, the resultant modified system 300 is illustrated in FIG. 3. Accordingly, the SoC 300 may include a processor (CPU) 310, system interconnect bus(es) 320, a memory controller 330 and internal memory 332, intellectual property (IP) blocks 340 (e.g., IP1 and IP2), a security engine block 350 having a security engine controller 352, JTAG/Debug test interface 360, Input & Output peripherals 370, and a voltage regulator 380, among other components, in addition to a secure DEEM controller 355 and individual DEEM decommissioning mechanisms or modules 305

Correspondingly, in various embodiments, the process is activated and the system is considered to be in the DEEM mode when one of the DEEM trigger conditions is observed. Activation of an exemplary DEEM mode can result in all security primitives 368 being completely destroyed; all test and debug structures 360 being permanently disabled; all critical memory modules 332 being erased and their controllers 330 being destroyed; high entropy parts 340 of the system being erased and rerouted; and/or a proper decommissioning sequence being utilized to prioritize destruction based on the asset type.

In order for the DEEM mode to be properly initiated, a set of specific trigger conditions need to be met before the system is destroyed. These conditions allow for multiple use cases, ranging from highly secure and continuous authentication to simple end-of-life DEEM execution. DEEM trigger conditions include, but are not limited to, remote decommissioning, failed authentication, tamper detection, end of life, and secret key abuse.

Remote decommissioning involves the SoC owner initiating the DEEM mode remotely. The initiation can be performed by applying a DEEM key, which is a secret key that commands the DEEM controller 355 to start the decommissioning sequence. In various embodiments, the DEEM key can be received during normal operation and can be sent remotely through one of the SoC's peripheral ports.

For a failed authentication trigger condition, the DEEM sequence is initiated when the authentication process fails. In various embodiments, the frequency of authentication checks mainly depends on the implemented authentication procedure, where some authentication procedures perform the authentication at power up, while others perform it periodically. An exemplary authentication process is usually implemented in the SoC's security engine, and a set of security primitives is employed to provide the necessary signatures and fingerprints. When the authentication process fails, the DEEM controller 355 receives a command to initiate the DEEM sequence.

For a tamper detection trigger condition, the DEEM sequence is activated when an unauthorized physical tampering is detected. In various embodiments, there are various tampering detection methods that can report if an SoC is being physically probed or modified. Such detection methods can be associated with a DEEM controller 355 in order to immediately decommission the system when a malicious modification is observed.

For an end of life trigger condition, a DEEM trigger is initiated when an SoC reaches its end-of-life usage limit. This condition helps preventing adversaries from recycling the chip and creating counterfeits. An end-of-life limits is usually determined by the main application's use case, where the SoC is decommissioned when the entire system is retired. Alternatively, the SoC can also be decommissioned when it reaches its expected operation life cycle. Determining the life cycle of an SoC can be done using many existing aging detection techniques.

In a secret key abuse trigger condition, a DEEM sequence is initiated when the secret key for a protected module is being analyzed suspiciously. In general, a suspicious behavior can be indicated by a secret key being brute-forced or a high number of incorrect attempts being observed. In various embodiments, the DEEM controller 355 is informed and the decommissioning sequence is initiated when a suspicious behavior is detected.

Next, in order for the DEEM mode to cause a permanent and irreversible transformation of the system, a set of analog decommissioning mechanisms 305 can be implemented to cause the most impactful erasing/hiding of any design intent and to act as quickly as possible. Such DEEM decommissioning mechanisms 305 can involve, but are not limited to, one-time programmable (OTP) antifuse; path delay; and/or voltage surge.

Accordingly, one-time programmable (OTP) antifuse memory cells can be designed to cause a permanent transformation after a one-time configuration routine. OTPs can be utilized in security-oriented applications due to their irreversible and reliable properties. In various embodiments of DEEM, OTPs are the main component that are integrated in all decommissioning mechanisms 305.

For the path delay mechanism, a performance degradation of the SoC can be applied to highly reduce the performance of the SoC when in DEEM mode. As such, the degradation can be applied to selected critical paths and modules to cause racing and invalid data propagation behavior, in which a path delay is implemented by permanently activating delay buyers using OTP-controlled-paths.

Figure 4A:
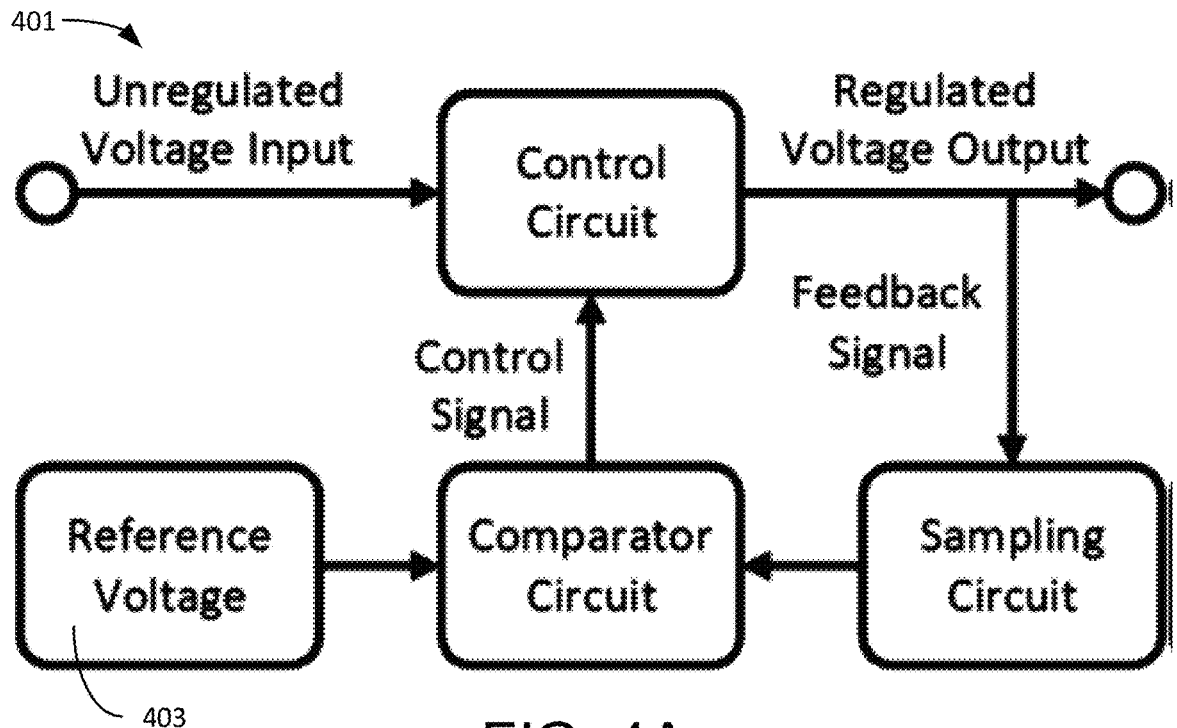
FIG. 4A shows an overview of a series voltage regulator in accordance with the present disclosure.
Figure 4B:
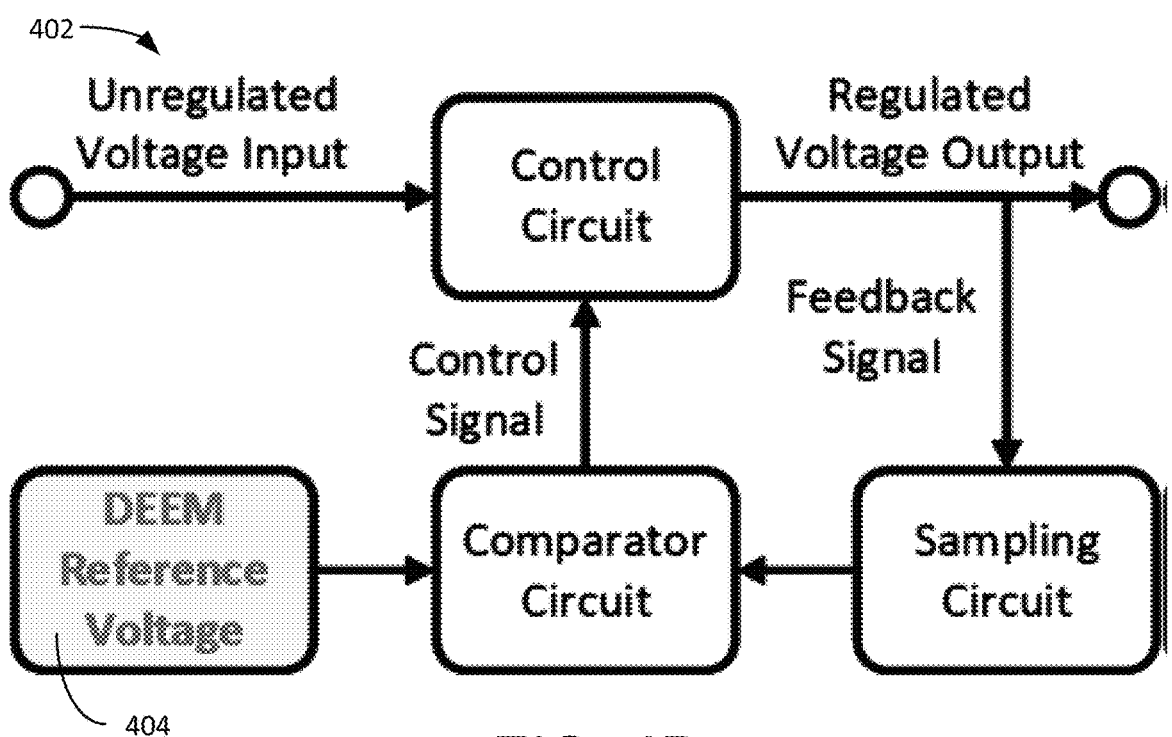
FIG. 4B shows an overview of a modified regulator when a DEEM mode is initiated in accordance with various embodiments of the present disclosure.

For the voltage surge mechanism, a high voltage surge can be produced in order for highly sensitive electrical components to be disabled when DEEM mode is initiated. In various embodiments, the electrical components can include, but is not limited to, Low Noise Amplifiers (LNA), analog filters, and clock generators. Additionally, in various embodiments, increasing the voltage level (to a high voltage reference level from a regular/normal voltage reference level) causes a surge in the device's temperature, which can accelerate the decommissioning process and burn/melt most of the silicon-based components in the SoC. FIG. 4A shows an overview of a series voltage regulator 401, and FIG. 4B shows an overview of a modified regulator 402 when DEEM mode is initiated in accordance with various embodiments of the present disclosure (where a high voltage ("DEEM") reference 403 is applied instead of a regular voltage reference 404).

Figure 5:
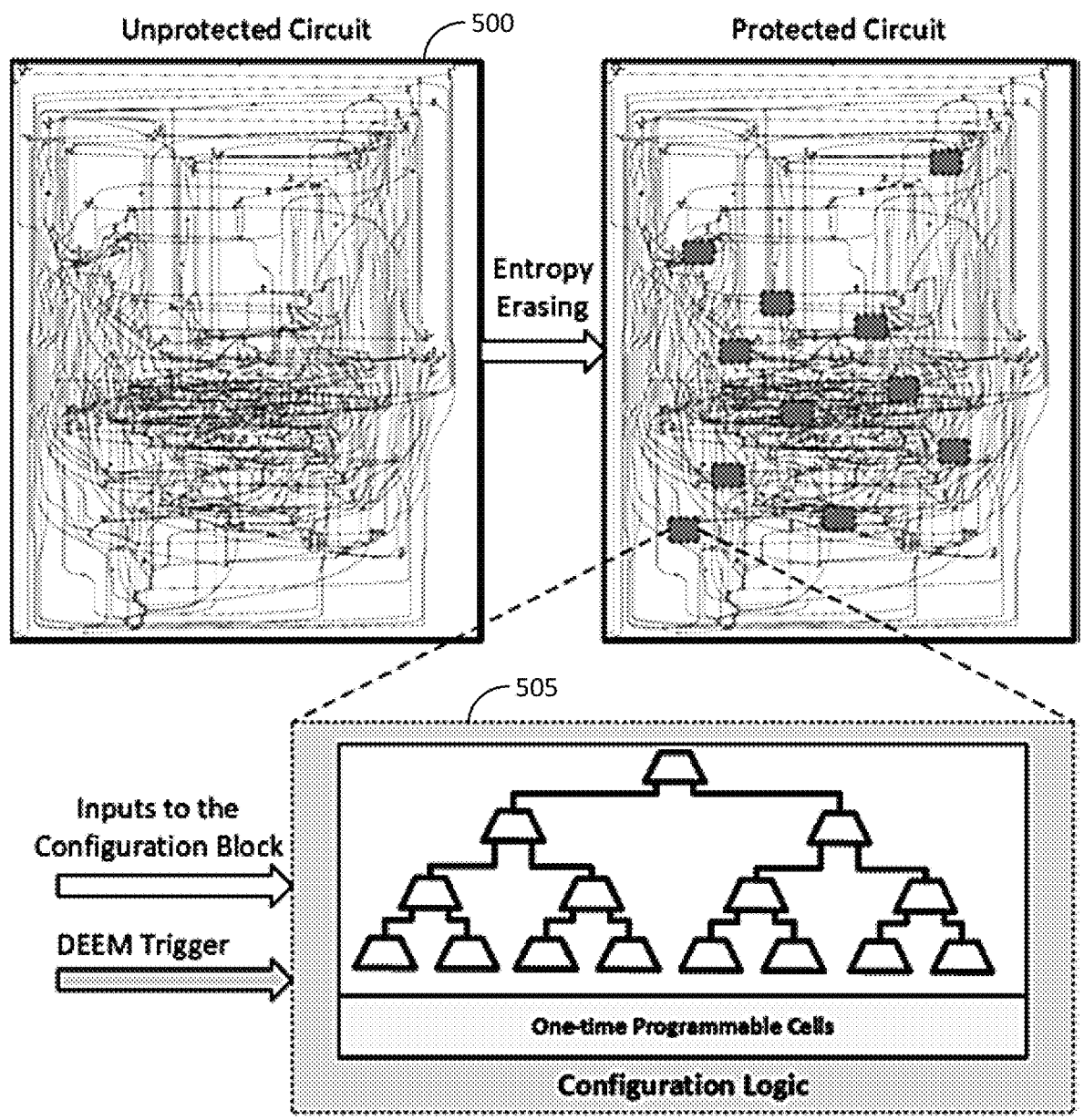
FIG. 5 shows a side by side view of an unprotected circuit (left) and an exemplary protected circuit (right) having entropy erasing modules in accordance with various embodiments of the present disclosure.

As part of an exemplary DEEM procedure, various components are decommissioned/erased and specific security primitives are disabled. For example, in order to disable the core of each IP in the protected SoC, high entropy regions can be targeted for erasing when the DEEM mode is initiated. High entropy regions are defined as the parts of the circuit that have the highest switching activity. In order for DEEM to erase the entropy, high entropy regions are replaced with OTP-based configurable blocks, in various embodiments. As such, the OTP-based configurable blocks are implemented to provide the correct functionality for the protected system, and when the DEEM mode is initiated, the OTPs are programmed to alter the blocks' configuration and corrupt the functionality. FIG. 5 illustrates an example of a circuit 500 being modified with DEEM decommissioning modules in the form of entropy erasing modules 505 (comprising OTPs).

Figure 6:
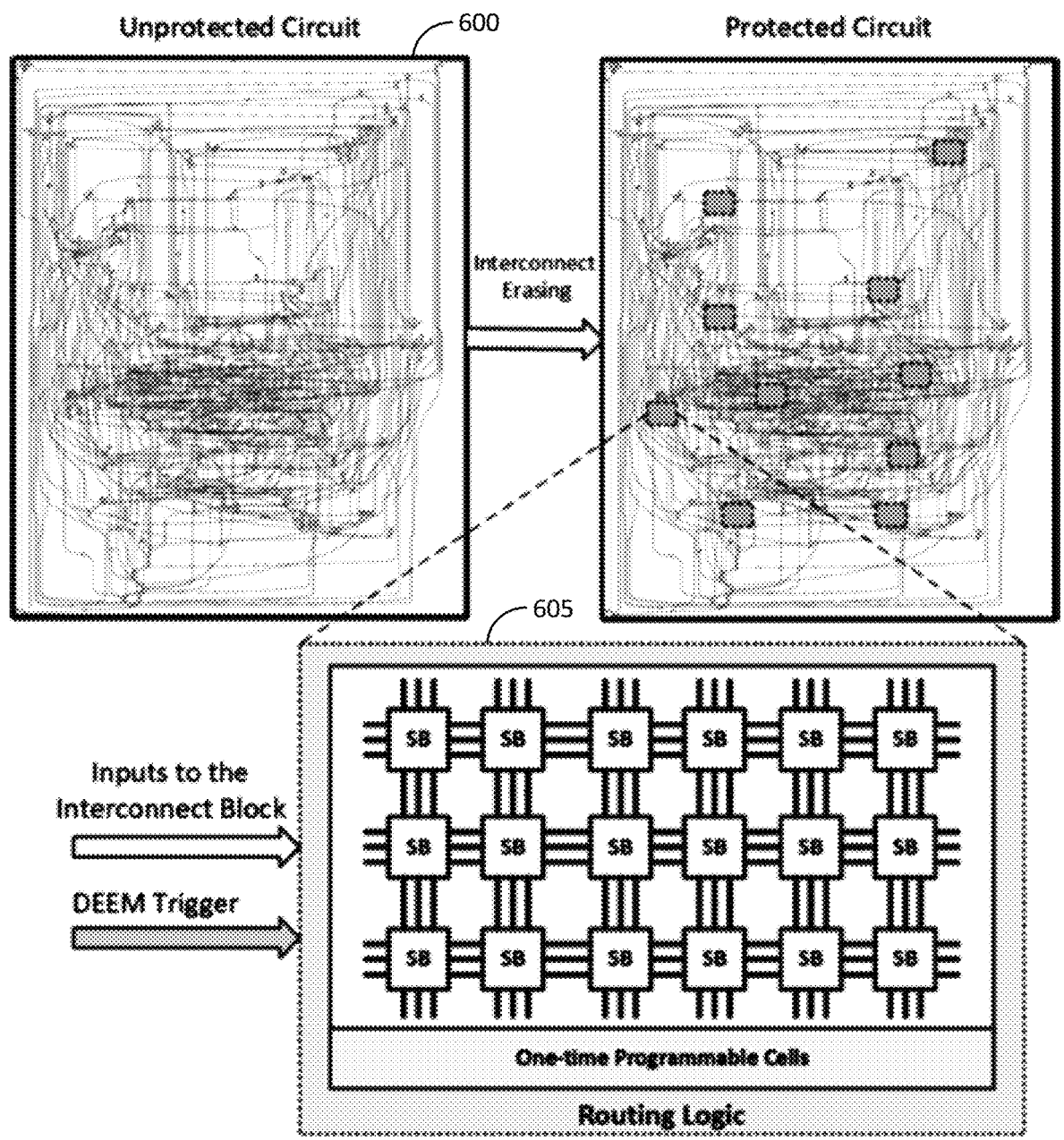
FIG. 6 shows a side by side view of an unprotected circuit (left) and an exemplary protected circuit (right) having interconnect erasing modules in accordance with various embodiments of the present disclosure.

In addition to entropy erasing, DEEM is also capable of performing interconnect erasing of the protected IP. In an exemplary interconnect erasing procedure, high logic-cone-size nets are replaced with OTP-based configurable interconnects, which can include multiple possible routes for each input. Such interconnects allow for correct routing when the protected system is in the operational mode, but the interconnects randomly shuffle the routes when the DEEM mode is triggered. In various embodiments, the shuffling of the routes is irreversible due to the use of OTP cells, and the resultant circuit is a highly corrupted function with altered paths. FIG. 6 illustrates an example of a circuit 600 being modified with DEEM decommissioning modules in the form of interconnect erasing modules 605.

Next, Finite State-Machine (FSM) erasing can disrupt the use of the IP (or a system) with logical changes to the operation of the IP. Such change ensures that the IP can never be used once the disruption takes place. Once a triggering condition has been met, a pre-defined logical transformation can take place in the IP which causes the IP to work in a non-functional mode. As such, state space obfuscation can be used for the non-functional mode.

Figure 7:
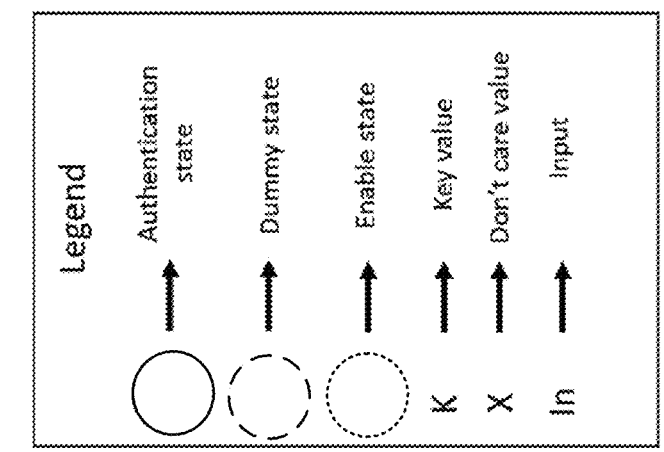
FIG. 7 shows a state transition diagram of an obfuscation finite state machine (OFSM) in accordance with various embodiments of the present disclosure.
Figure 7:
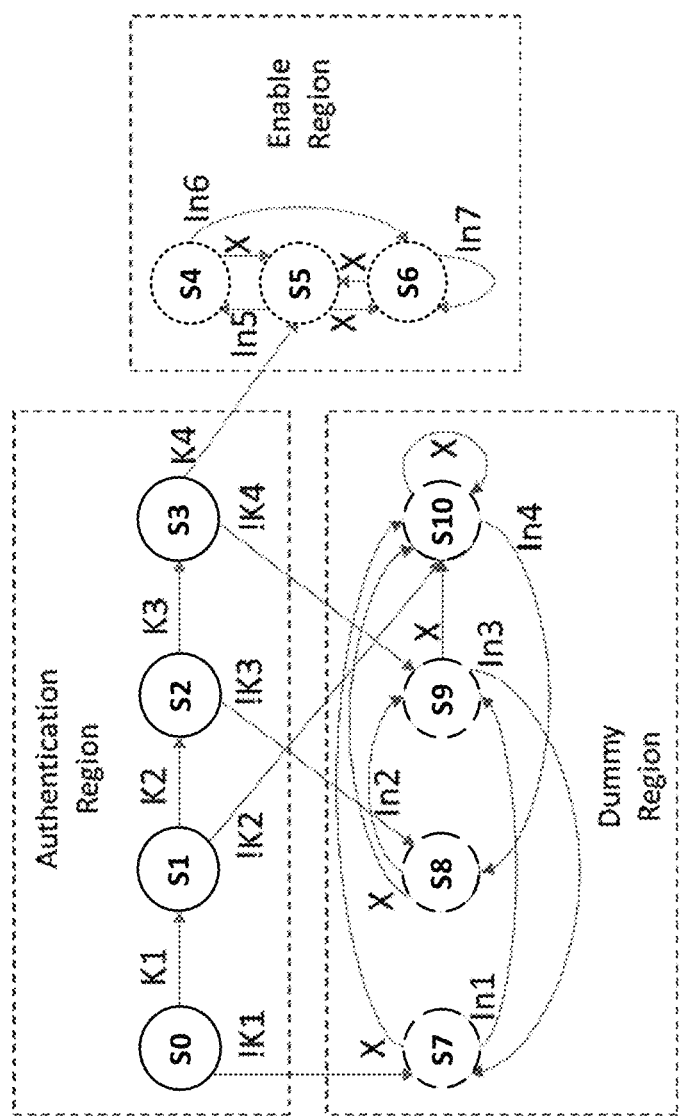

Accordingly, additional FSMs called obfuscation FSMs (OFSMs) can be inserted as a locking mechanism within a circuit design. Such OFSMs can take certain values as input conditions through primary input ports of the design to traverse through certain states. The input values to each OFSM state transition are considered as key values which essentially form the unlocking key sequence of the design. The state transition diagram of a sample OFSM, which can be inserted into the design, is shown in FIG. 7. Based on the size of the design, a number of OFSMs may vary from one to many. The added FSMs can vary in the number of flip-flops, fan-in and fan-out cone size, the number of states in each FSM, etc. In various embodiments, the FSMs are generic state machines which have three regions of operations—an authentication region, a dummy region, and an enable region, where each region is a collection of a number of states.

Figure 8:
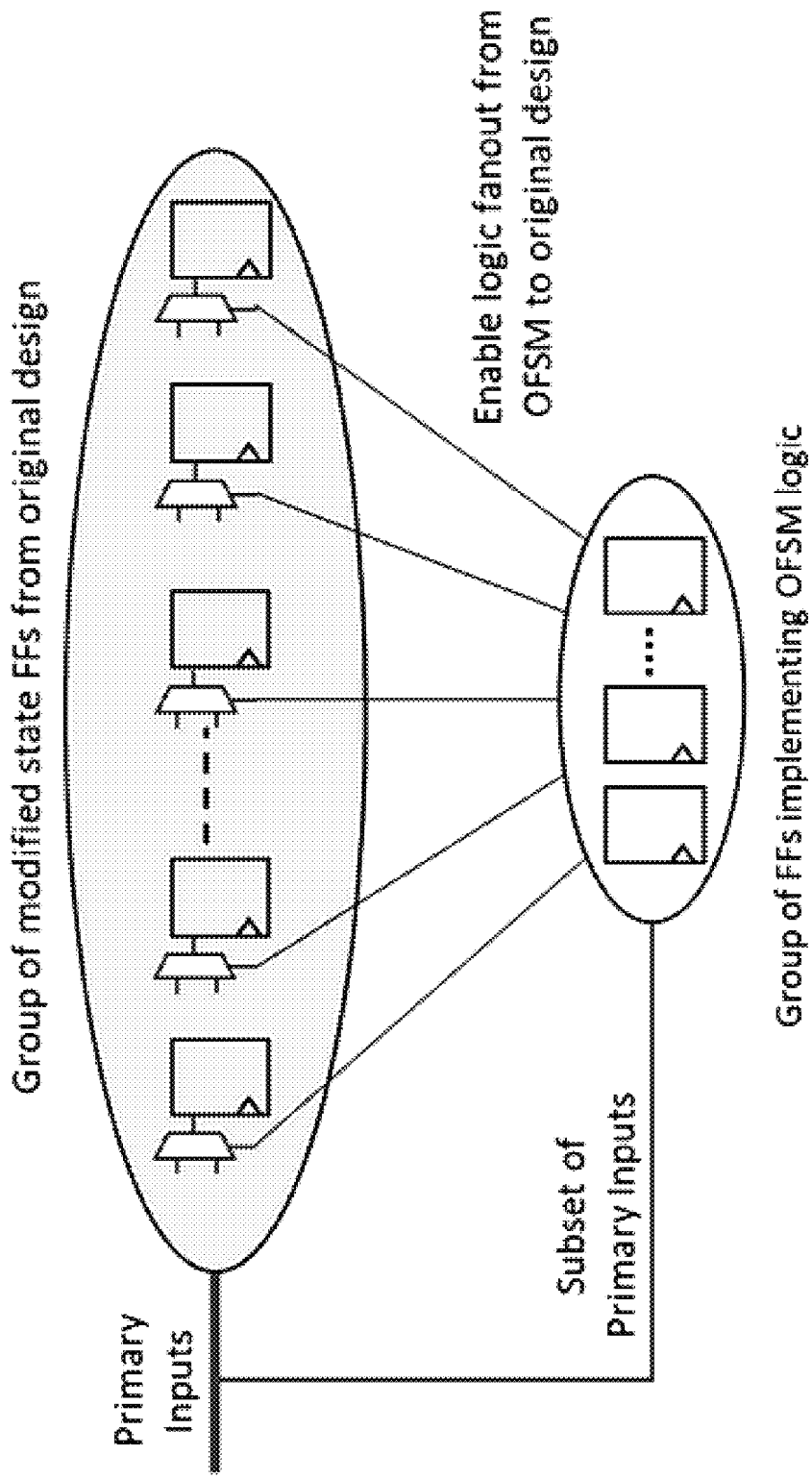
FIG. 8 shows an obfuscated design having an OFSM as an operating mode controller via enable logic in accordance with various embodiments of the present disclosure.

In general, OFSMs use primary inputs as well as some internal nets of the original design (intended to be obfuscated) as inputs to assign certain conditions for the state transitions through these regions. Provided that the correct key values are applied through the primary inputs, the FSM will traverse through the authentication region and reach the enable region. If a wrong key is applied at any point of this traversal, the FSM will enter the dummy region and end up being stuck in the dummy region since there is no path back to any of the other regions. To avoid periodic state transitions, the conditions of state transitions in the dummy region are made distinct and random to incorporate random transitions which allow for hiding the added FSMs. All three regions can generate a set of enable signals which, if correct, will enable the normal mode of operation of the design. If not, dummy logic that is being multiplexed at the data input port of the flip-flop, as shown in FIG. 8, activates the non-functional mode of the design.

Figure 9A:
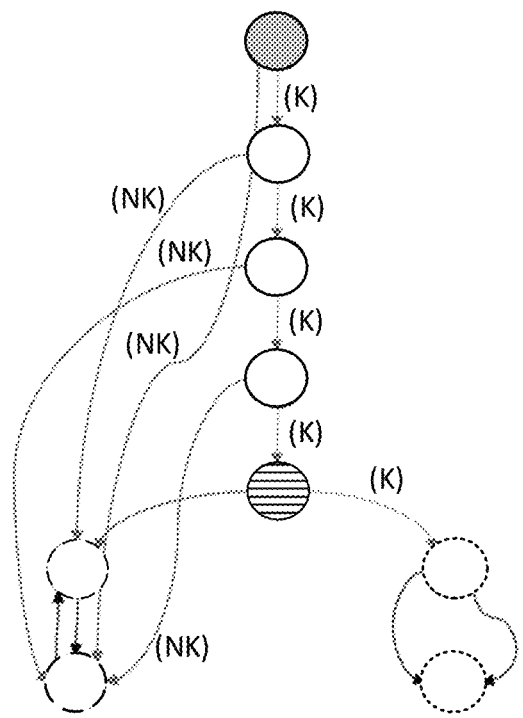
Figure 9B:
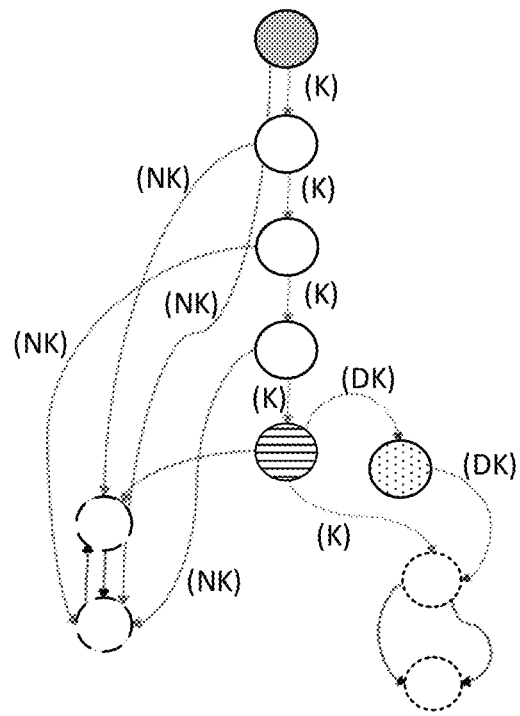
Figure 9C:
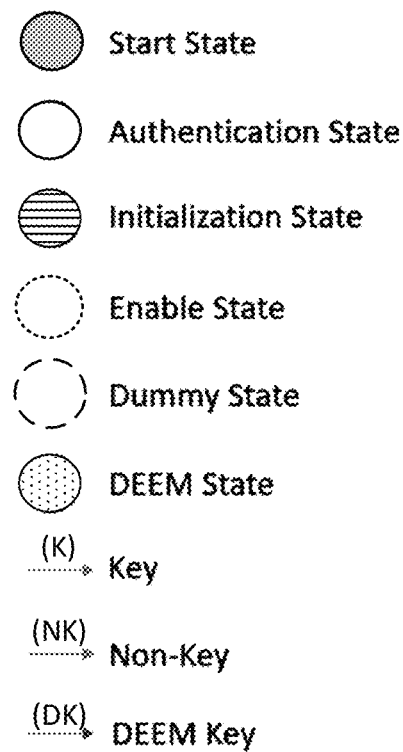

Upon application of the correct key sequence, the OFSMs enter into the enable region of the OFSM which makes the design functional. In order to implement DEEM, in various embodiments, a new region is provided in between the authentication region and the enable region, which is referred to as a DEEM region. Thus, before entering the enable region, after the application of an unlocking key sequence, the OFSM will need to traverse a set of DEEM states, where an extension of a key sequence will be checked, which is called a DEEM sequence. FIGS. 9A-9C illustrate the extension of an exemplary obfuscation algorithm which allows logical erasing by inserting additional DEEM states. In particular, FIG. 9A shows a state transition diagram of an OFSM to obfuscate an IP; FIG. 9B shows an extension of the OFSM to insert additional states in order to facilitate DEEM; and FIG. 9C provides a legend for FIGS. 9A-9B. As an extension of the OFSM (shown in FIG. 9A), at the end of traversal of the authentication region, if the DEEM sequence is also being applied (as shown in FIG. 9B), the OFSM can reach the DEEM region, which have various logic operations to disrupt the functionality, such as, but not limited to, resetting the flip-flops, taking the OFSM to dummy states, and abrupt initialization of state flip-flops.

For resetting the flip-flops, a data-path reset mechanism can be implemented to reset random flip-flops present in the IP even if the global reset of the IP is not asserted. Such resetting operations can be accomplished by extending the enable logic generated by the OFSM.

For taking the OFSM to dummy states, it is possible to switch from the DEEM region to the dummy region and not traverse to the enable region even though a correct unlocking key is applied, where the dummy region is already defined as a non-functional region of the IP.

For an abrupt initialization of state flip-flops, the original design flip-flops can be initialized to functional states of the original IP upon the application of an unlocking key sequence, where OFSMs facilitate such initialization. However, once the DEEM triggering condition is met, the OFSM can have the ability to initialize the design state flip-flops to non-functional states when the OFSM is in the DEEM region and switch to the enable region of operation. Even though OFSMs are in the enable region with a proper key access, the original functionality will be lost and the IP will be of no use due to the incorrect initialization of state flip-flops.

Figure 10A:
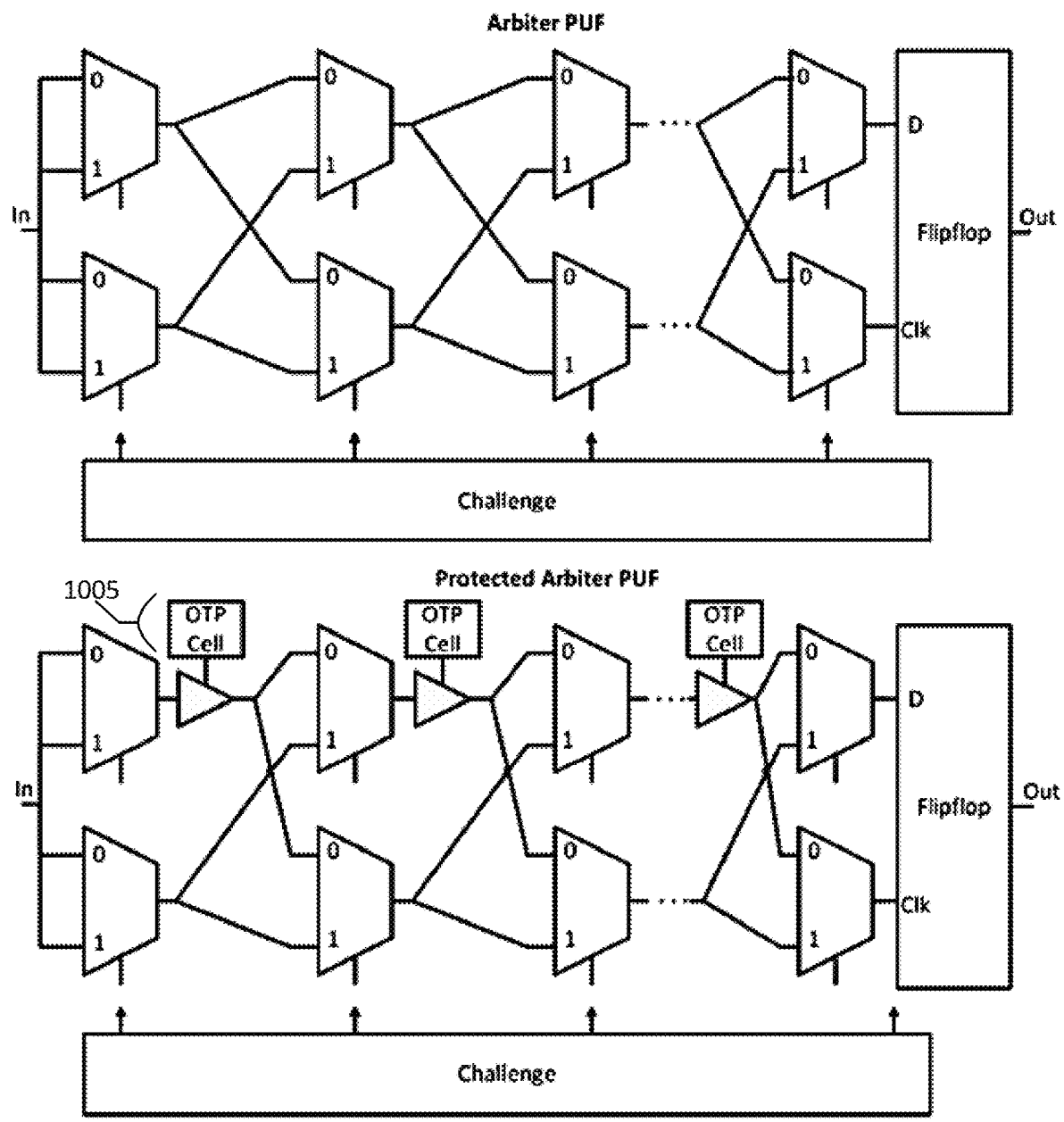
FIG. 10A shown an overview of an arbiter PUF (physically unclonable function) with (bottom) and without (top) a path delay mechanism that forces the upper side of the PUF to be slower than a lower side when the DEEM mode is activated, in accordance with various embodiments of the present disclosure.
Figure 10B:
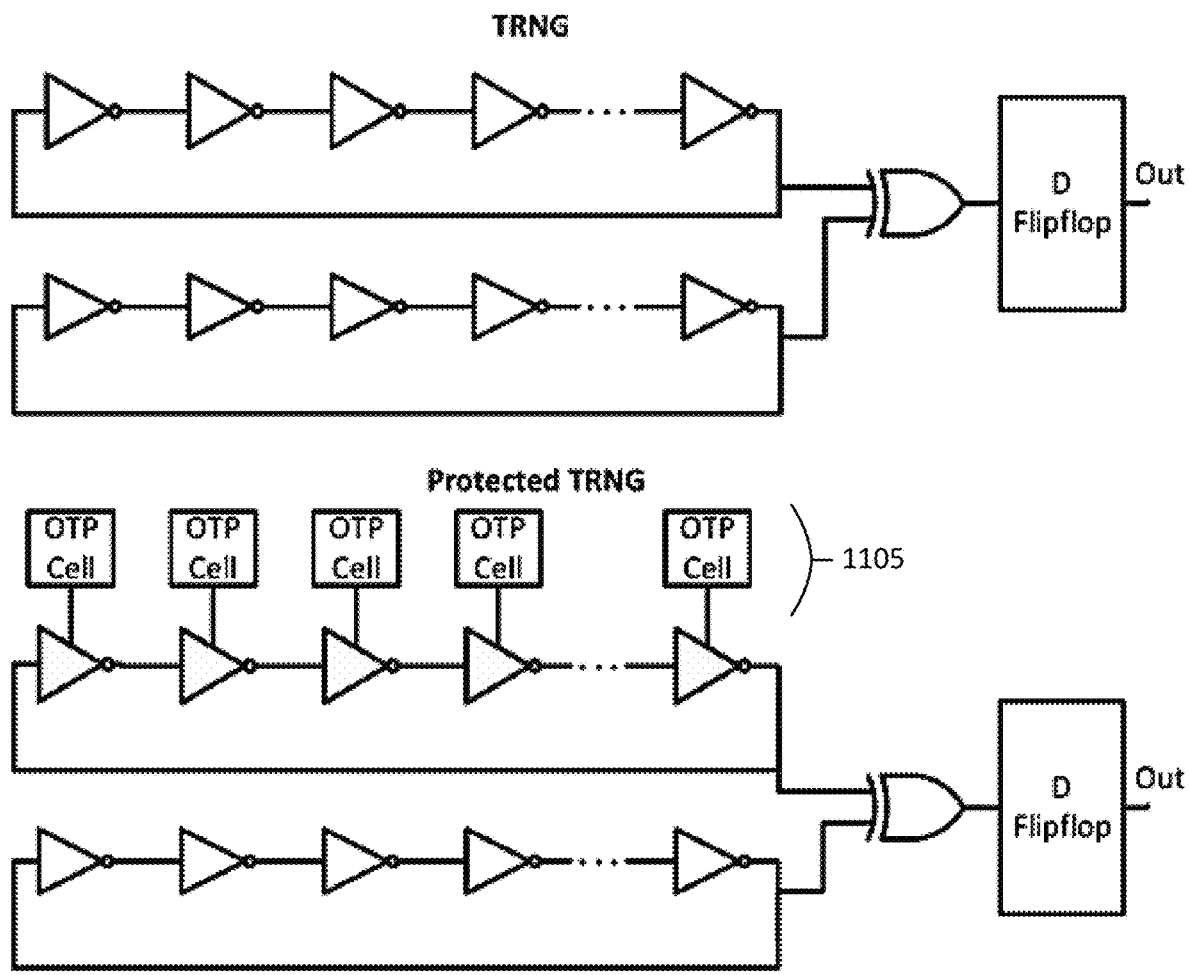
FIG. 10B shows an overview of a ring oscillator TRNG (truly random number generator) with (bottom) and without (top) a path delay mechanism in accordance with various embodiments of the present disclosure.

As discussed, there is a flexibility in terms of the size of the non-functional states implemented by the OFSM. Accordingly, a new set of states can be traversed to reach the DEEM region which will enable the design but in a non-functional state. In addition to decommissioning or erasing SoC components via entropy erasing, interconnect erasing, and/or FSM erasing, security primitives of the SoC can also be disabled. To disable security primitives in the protected SoC, a voltage surge operation is performed in various embodiments. Primitives such as Physical Unclonable Functions (PUFs) and True Random Number Generators (TRNGs) are highly sensitive to any variation in Transistor level structures. Hence, a directed high voltage surge will dramatically alter the behavior of these primitives and force them to provide invalid/low entropy responses. Additionally, path delay operations can be employed to reduce entropy and force the security primitives to produce predictable responses. To illustrate, FIG. 10A shown an overview of an arbiter PUF (physically unclonable function) with (bottom) and without (top) a path delay mechanism 1005 that forces the upper side of the PUF to be slower than a lower side when the DEEM mode is activated, in accordance with various embodiments of the present disclosure. Additionally, as shown in FIG. 10B, a path delay mechanism 1105 can be applied to a ring oscillator TRNG (truly random number generator) (as shown on bottom portion of the figure in comparison to the top portion of the figure), in which OTP cells add path delay to one side that will force the TRNG to provide a predictable pattern when in DEEM mode, in accordance with various embodiments of the present disclosure.

Additionally, neural network hardware can be part of a system on chip (SoC), Field Programmable Gate Array (FPGA), or Graphics Processing Unit (GPU), which can also be decommissioned, in accordance with embodiments of the present disclosure. The weights and structural configuration information in a trained neural network can be removed from the hardware implementation of a machine learning model during the decommissioning process. In various embodiments, the DEEM controller will initiate the process of decommissioning a neural network hardware after appropriate authentication. The decommissioning process will start with erasing the weights from the neuronal nodes and the links between the neurons, in which the weights are stored in volatile or non-volatile memory. The erasing of node weights can follow the process described below for decommissioning memory cells. To remove the connectivity information of a neural network, programmable interconnects can be inserted in the form of mux and demux elements or FPGA-like S/C type programmable switches, where the switches can be configured by programming configurable bits, which will be erased during decommissioning, thereby removing the connectivity information. In particular, such processes will prevent an attacker from understanding the neural network structure used for a specific application.

Plus, to erase any critical assets stored in memory modules, a 2-step-decommissioning process can be performed to the protected SoC, in various embodiments. In the first step, a "delete-all" command is issued to all accessible memory modules, which can help clear stored keys/credentials and remove any asset that may be targeted by adversaries. If the time taken to erase all stored data is too long, an alternative procedure may be performed to corrupt each memory block by randomly modifying certain memory locations in order to corrupt any observable data. After corrupting/deleting stored data, the second step of the decommissioning process is to perform a high voltage surge to all memory modules and controllers. This surge can destroy the modules and alter the functionality of storing circuits. Additionally, destroying the memory controllers can help disable accessibility to the memory modules.

For printed circuit board (PCB) decommissioning, major microchips used in a PCB and the major interconnects between them can be disabled. In various embodiments, an exemplary scheme to decommission a PCB utilizes the existing JTAG based Design for Testability (DFT) infrastructure such that the JTAG header is modified to integrate a DEEM controller. Upon appropriate authentication, the DEEM controller can use the boundary scan chain to send secret decommissioning control signals (in the form of a key sequence) to the microchips, which are connected to the JTAG chain. Upon receiving the decommissioning signal, the input and outputs of the chips will be permanently locked or disconnected by using one time programmable (OTP) memories (e.g., antifuse), which requires updating the JTAG infrastructure inside a chip to be able to disconnect/lock the IO ports when receiving a secret key sequence from the DEEM controller (e.g., the modified JTAG header). In various embodiments, a small finite state machine based controller can be integrated inside a chip for IO locking when a secret key is received through the JTAG chain.

Further, the interconnects between two chips which are part of the JTAG chain can also reprogrammed during the decommissioning process. The reprogramming can be accomplished by creating programmable switch boxes for the interconnects, which can be programmed to remove the original connections (or configuration) during decommissioning.

In brief, the present disclosure provides systems, apparatus, and methods for decommissioning and erasing of entropy in microelectronic systems (DEEM). DEEM performs an irreversible digital and analog erasing of the critical parts of a protected system. The present disclosure has shown that a set of erasing mechanisms can be used to remove any design intent and disable the functionality of the overall system when the DEEM mode trigger conditions are met. An exemplary DEEM controller module can be embedded into a system on chip (SoC)'s security engine in order for the DEEM mode to be initiated. The present disclosure outlines a full DEEM implementation approach, where all critical parts are decommissioned in a secure and timely fashion. Additional embodiments of such DEEM systems, apparatuses, and methods can include extending DEEM to cloud-based systems and incorporating a PCB level DEEM mode. Other variations and modifications are also contemplated.

Assessment of an exemplary methodology for decommissioning and erasing of entropy in microelectronic systems (DEEM) can be performed using two attack complexity metrics based on the level of access to the locked hardware IP that can be obtained by an adversary. In the case of a black-box attack, the following assumptions are made: (1) the attacker has obtained access to a locked IP as well as a functional unlocked IP (oracle); (2) the attacker does not have access to the gate-level netlist of the IP; and (3) the attacker is not able to reverse engineer the IC. Hence, the attacker is forced to treat the design as a black-box. We also assume that the attacker is able to determine the length of the secret key and the width of each key vector, which is a very strong assumption in favor of the adversary, but such vulnerabilities may arise if the IP goes through several untrusted facilities anytime during its life cycle. In order to unlock the design, the attacker will have to correctly predict the entire unlocking key sequence.

The Black-Box attack Complexity (BBC) can be quantified in terms of the length of the key sequence P and the width of each key vector Q as follows:

$$BBC = 2^{PQ} \quad (1)$$

The BBC attack metric computes the minimum number of trials required to unlock the design. The value of the BBC metric does not consider the difficulty of determining the values of P and Q, which would make it harder to perform this kind of attack, increasing the complexity.

The BBC of the design is generally calculated for just the unlocking key sequence using Equation (1). Even though the DEEM sequence can applied independently from the unlocking sequence, the DEEM sequence can be seen as an extension of the unlocking key. If the length of the DEEM sequence is $P_d$ and the width of each key vector is $Q_d$, the BBC for the DEEM methodology can be calculated as:

$$BBC_{deem} = 2^{PQ+P_dQ_d} \quad (2)$$

In the case of a white-box attack, the following assumptions are made: (1) the attacker can access the gate-level design of the locked IP; (2) the attacker will perform structural analysis on the locked design and can distinguish between a state element and other sequential components; and (3) the attacker is able to find out how many state elements have been added by DEEM (a strong assumption) and already knows the number of state elements in the original IP. During the attack, the attacker will try to identify and remove the sequential logic added during obfuscation. Accordingly, the attacker will need to randomly select a subset of the state elements and drive them to a state that generates the golden outputs matching the oracle. Assuming that the original design has n state flip-flops and r flip-flops are required to realize the timers and added FSMs, the White-Box Complexity (WBC) can be computed as follows:

$$WBC = {}^{n+r}C_r \times 2^r \quad (3)$$

The WBC metric can be used to quantify the minimum number of trials required by the attacker to discover one of the enable states. When the DEEM sequence is applied, and if any triggering condition is met, DEEM proceeds to modify the design irreversibly via analog decommissioning and logic entropy erasing. The trigger conditions are such that attempts at reverse engineering the design can disrupt the functionality permanently and make the IP unusable. This type of situation can be incorporated into the white-box attack complexity in the form of a DEEM factor, $D_f$, which is a function of the modification mechanisms implemented and depends upon the probability of the triggering conditions being met during an attack. The value of the DEEM factor will be design specific. Also, The DEEM factor can be configured according to the decommissioning target specified by the user. The WBC value for DEEM then becomes:

$$WBC_{deem} = {}^{n+r}C_r \times 2^r \times D_f \quad (4)$$

Using these metrics, it can be shown that DEEM is sufficiently secure to prevent a wide range of attacks.

The present disclosure makes innovative contributions that include a robust security solution for decommissioning and erasing of entropy in microelectronic systems; the performance of a set of irreversible analog and digital transformations that hide all design intents secrets; one-time programmable cells being used to drive the erasing mechanisms; a voltage sure procedure to alter and destroy silicon-based circuits; path-delay modifications that reduce the performance and cause invalid behavior of the system; entropy erasing procedures that include configurable logic locks that can remove critical functionality description; interconnect erasing procedures that alter the circuit's routes for high logic-cone nets; FSM-based erasing procedures to alter the state transitions of the IP's function; security primitive and memory specific erasing procedures to selectively decommission critical-data modules; and/or artificial intelligence or machine learning hardware implementation with sensitive information about a trained model or classifier can be successfully erased and disabled by removing the values from programmed memory cells that store critical weight values.

In various embodiments, DEEM systems, apparatus, and methods of the present disclosure can be applied to a microelectronic component through both physical access as well as remotely through a secure connection. DEEM can be used in various other scenarios, such as being used to disable and destroy sensitive information in a microchip and printed circuit board at end of life of a system through physical access of the system or remote access; being used when a system is occupied by an adversary and cannot be retrieved by its legitimate owner; and being used on a test chip or PCB when a chip (or PCB) fails manufacturing testing in an untrusted testing facility and needs to be discarded.

It should be emphasized that the above-described embodiments are merely possible examples of implementations, merely set forth for a clear understanding of the principles of the present disclosure. Many variations and modifications may be made to the above-described embodiment(s) without departing substantially from the principles of the present disclosure. All such modifications and variations are intended to be included herein within the scope of this disclosure.

Therefore, at least the following is claimed:

1. A method of protecting a system on chip integrated circuit comprising:
   operating the system on chip integrated circuit under a normal mode of operation;
   detecting, by a decommission controller, a triggering condition for a decommission operation to be initiated for the system on chip integrated circuit, wherein the triggering condition comprises one or more of an authentication process failure or a brute-force attack with multiple failed attempts to analyze a secret key, wherein the decommission controller is integrated on a security engine of the system on chip integrated circuit;
   initiating, by the decommission controller, a decommission mode for the system on chip integrated circuit after detection of the triggering condition; and
   causing, by the decommission controller, functionality of a component of the system on chip integrated circuit to be irreversibly disabled, by at least one decommission module that is incorporated within the component of the system on chip integrated circuit, after initiating the decommission mode,
   wherein the component comprises a voltage regulator, an input/output controller, an intellectual property core, a memory controller, a memory cell, or a security primitive of the system on chip integrated circuit; and
   wherein the at least one decommission module alters a voltage level applied to the component that causes the component to burn or melt the component; activates delay buffers applied to the component to initiate invalid behavior of the component; erases weight values applied to neural network hardware; irreversibly alters routing between interconnects of the component of the system on chip; or alters state transitions of a finite state machine for the component of the system on chip that cause the component to stop functioning.

2. The method of claim 1, wherein the triggering condition is detected in response to receipt of a secret key that commands the decommission controller to initiate the decommission mode for the system on chip integrated circuit, wherein the decommission controller is incorporated within a security engine of the system on chip integrated circuit.

3. The method of claim 2, wherein the secret key is received via a peripheral port of the system on chip integrated circuit.

4. The method of claim 2, wherein the secret key is contained within a header of a boundary scan test message.

5. The method of claim 1, wherein the triggering condition comprises detection of physical tampering of the system on chip or comprises an occurrence of an end of life usage limit for the system on chip.

6. The method of claim 1, wherein the at least one decommission module alters a voltage level applied to the component that causes the component to burn or melt the component, wherein the component is formed of silicon.

7. The method of claim 1, wherein the at least one decommission module activates delay buffers applied to the component to initiate invalid behavior of the component as part of causing the functionality of the system on chip integrated circuit to be irreversibly disabled.

8. The method of claim 1, wherein the at least one decommission module erases weight values applied to neural network hardware as part of causing the functionality of the system on chip integrated circuit to be irreversibly disabled.

9. The method of claim 1, wherein the at least one decommission module irreversibly alters routing between interconnects of the component of the system on chip as part of causing the functionality of the system on chip integrated circuit to be irreversibly disabled.

10. The method of claim 1, wherein the at least one decommission module erases or corrupts data stored on one or more memory modules as part of causing the functionality of the system on chip integrated circuit to be irreversibly disabled.

11. The method of claim 10, wherein the at least one decommission module further destroys a functionality of memory storing circuits or controllers as part of causing the functionality of the system on chip integrated circuit to be irreversibly disabled.

12. The method of claim 1, wherein the at least one decommission module alters state transitions of a finite state machine for the component of the system on chip as part of causing the functionality of the system on chip integrated circuit to be irreversibly disabled.

13. The method of claim 12, wherein the altered state transitions cause the component to stop functioning.

14. A system of protecting an integrated circuit comprising:
   a system on chip integrated circuit;
   a decommission controller integrated on a security engine of the system on chip integrated circuit; and
   at least one decommission module incorporated within a component of the system on chip integrated circuit, wherein the at least one decommission module is configured to irreversibly disable a functionality of the component upon being activated, wherein the at least one decommission module comprises a one-time programmable memory cell,
   wherein the decommission controller is configured to:
      detect a triggering condition for a decommission operation to be initiated for the integrated circuit, wherein the triggering condition comprises an authentication process failure or a brute-force attack with multiple failed attempts to analyze a secret key;
      initiate a decommission mode for the integrated circuit after detection of the triggering condition; and
      instruct the at least one decommission module to irreversibly disable functionality of the integrated circuit after initiating the decommission mode;
   wherein the component comprises a voltage regulator, an input/output controller, an intellectual property core, a memory controller, a memory cell, or a security primitive of the system on chip integrated circuit; and
   wherein the at least one decommission module alters a voltage level applied to the component that causes the component to burn or melt the component; activates delay buffers applied to the component to initiate invalid behavior of the component; erases weight values applied to neural network hardware; irreversibly alters routing between interconnects of the component of the system on chip; or alters state transitions of a finite state machine for the component of the system on chip that cause the component to stop functioning.

15. The system of claim 14, wherein the triggering condition comprises a physical tampering of the system on chip or an occurrence of an end of life usage limit for the system on chip.

16. The system of claim 14, wherein the at least one decommission module erases or corrupts data stored on one or more memory modules as part of irreversibly disabling functionality of the integrated circuit, wherein the at least one decommission module further destroys a functionality of memory storing circuits or controllers.

* * * * *